(12) United States Patent
Tateishi (10) Patent No.: US 10,435,091 B2
(45) Date of Patent: Oct. 8, 2019

(54) ELASTIC CRAWLER AND ELASTIC CRAWLER DEVICE

(71) Applicant: BRIDGESTONE CORPORATION, Chuo-ku, Tokyo (JP)

(72) Inventor: Kenji Tateishi, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/741,768

(22) PCT Filed: Jul. 28, 2016

(86) PCT No.: PCT/JP2016/003492
§ 371 (c)(1),
(2) Date: Jan. 4, 2018

(87) PCT Pub. No.: WO2017/017957
PCT Pub. Date: Feb. 2, 2017

(65) Prior Publication Data
US 2018/0194409 A1    Jul. 12, 2018

(30) Foreign Application Priority Data

Jul. 30, 2015 (JP) ................. 2015-151243

(51) Int. Cl.
*B62D 55/24* (2006.01)
*B62D 55/20* (2006.01)
(Continued)

(52) U.S. Cl.
CPC ......... *B62D 55/244* (2013.01); *B62D 55/202* (2013.01); *B62D 55/125* (2013.01); *B62D 55/14* (2013.01)

(58) Field of Classification Search
CPC .. B62D 55/244; B62D 55/253; B62D 55/125; B62D 55/14
(Continued)

(56) References Cited

U.S. PATENT DOCUMENTS 6,170,925 B1 *  1/2001  Ono ...................... B62D 55/24
                                                   305/171
7,300,119 B2 * 11/2007  Ueno .................... B62D 55/24
                                                   305/165
(Continued)

FOREIGN PATENT DOCUMENTS

CN    1330009 A    1/2002
CN    1886291 A    12/2006
(Continued)

OTHER PUBLICATIONS

Sep. 13, 2016, International Search Report issued in the International Patent Application No. PCT/JP2016/003492.
(Continued)

*Primary Examiner* — S. Joseph Morano
*Assistant Examiner* — Jean W Charleston
(74) *Attorney, Agent, or Firm* — Kenja IP Law PC (57) ABSTRACT

Provided is an elastic crawler and an elastic crawler device capable of achieving both low fuel consumption and excellent ride comfort. The elastic crawler comprises: a main body; cores respectively having a pair of wings and being embedded in a circumferential direction; a track roller rolling surface formed on an inner circumferential surface of the main body; a recess formed on the inner circumferential surface in a manner extending from the track roller rolling surface toward a widthwise outer side; lugs formed on an outer circumferential surface of the main body, the lugs respectively extending in a width direction between the cores from one end overlapping the track roller rolling
(Continued)

surface in a thickness direction toward the other end overlapping a part in which the wings of the cores are embedded in the thickness direction. The elastic crawler device comprises the elastic crawler, a sprocket and a track roller.

9 Claims, 7 Drawing Sheets

(51) Int. Cl.
    *B62D 55/125* (2006.01)
    *B62D 55/14* (2006.01)

(58) Field of Classification Search
    USPC ........ 305/129, 170, 171, 173, 174, 175, 177
    See application file for complete search history.

(56) References Cited

U.S. PATENT DOCUMENTS

| | | |
|---|---|---|
| 2002/0047306 A1 | 4/2002 | Watanabe et al. |
| 2007/0114845 A1* | 5/2007 | Choi ............... B62D 55/24 305/177 |
| 2007/0252433 A1 | 11/2007 | Fujita |
| 2009/0309415 A1* | 12/2009 | Shimozono .......... B62D 55/244 305/177 |
| 2011/0169324 A1* | 7/2011 | Ijiri .................... B62D 55/244 305/142 |
| 2018/0194409 A1 | 7/2018 | Tateishi |

FOREIGN PATENT DOCUMENTS

| | | | |
|---|---|---|---|
| JP | 2010052670 A | * | 3/2010 |
| JP | 2010052670 A | | 3/2010 |
| JP | 2012111368 A | * | 6/2012 |
| JP | 2012111368 A | | 6/2012 |
| WO | 2005073060 A1 | | 8/2005 |
| WO | 2017017957 A1 | | 2/2017 |

OTHER PUBLICATIONS

July 2, 2019, search result of Office Action issued by the China National Intellectual Property Administration in the corresponding Chinese Patent Application No. 201680044872.5.

* cited by examiner

ELASTIC CRAWLER AND ELASTIC CRAWLER DEVICE

TECHNICAL FIELD

This disclosure relates to an elastic crawler and an elastic crawler device.

BACKGROUND

Known as a conventional elastic crawler is one formed by arranging cavities extending in a width direction of an endless belt-like rubber crawler main body on an inner circumferential surface of the rubber crawler main body, in a manner spaced from each other in a circumferential direction, thereby allowing the rubber crawler main body to bend easily, to reduce a power loss during running and to improve a fuel efficiency (see, e.g., JP2012-011368A (PTL1)).

CITATION LIST

Patent Literature

PTL1: JP2012-011368A

SUMMARY

Technical Problem

The elastic crawler as described in PTL1 has lugs formed on only a part on an outer circumferential surface of the rubber crawler main body which overlaps a part in which wings of the cores are embedded in a thickness direction, thereby ensuring a thickness of the cavities, which enables further improvement of the fuel efficiency. However, in this case, since elasticity between the wings of the cores adjacent in the circumferential direction of the rubber crawler main body is softened (because an elasticity difference between parts in which the cores are embedded and spaces between the parts in which the cores are embedded increases), vibration during running increases, which occasionally causes deterioration of ride comfort.

This disclosure aims to provide an elastic crawler and an elastic crawler device capable of achieving both low fuel consumption and excellent ride comfort.

Solution to Problem

The elastic crawler according to this disclosure comprises: an endless belt-like main body having elasticity; a plurality of cores respectively having a pair of wings and being embedded in a manner spaced from each other in a circumferential direction of the main body, the wings respectively extending from a widthwise inner side of the main body toward a widthwise outer side of the main body; a track roller rolling surface formed on an inner circumferential surface of the main body in a manner extending in the circumferential direction of the main body; a recess formed on the inner circumferential surface of the main body in a manner extending between ones of the wings adjacent in the circumferential direction of the main body toward the widthwise outer side of the main body; and a plurality of lugs formed on an outer circumferential surface of the main body, the lugs respectively extending in a width direction of the main body between ones of the cores adjacent in the circumferential direction of the main body from one end overlapping the track roller rolling surface in a thickness direction of the main body toward the other end overlapping a part in which the wings of the cores are embedded in the thickness direction of the main body.

The elastic crawler according to the present embodiment is capable of achieving both low fuel consumption and excellent ride comfort.

The elastic crawler according to this disclosure may comprise a connecting lug being formed between ones of the lugs adjacent in the circumferential direction of the main body and connecting the ones of the lugs.

In this case, the volume of each lug is increased, which enables improvement of the durability of the lugs.

In the elastic crawler according to this disclosure, the connecting lug may be provided so as to form a gap at a position overlapping the recess in the thickness direction of the main body, the gap being formed by ones of the lugs adjacent in the circumferential direction of the main body and the connecting lug.

In this case, it is possible to further reduce the fuel consumption.

In the elastic crawler according to this disclosure, the connecting lug may be provided so as to form a gap at a position overlapping the track roller rolling surface and the cores in the thickness direction of the main body, the gap being formed by ones of the lugs adjacent in the circumferential direction of the main body and the connecting lug.

In this case, it is possible to improve the durability of the lug, and to simultaneously improve the ride comfort.

The elastic crawler device according to this disclosure comprises: the elastic crawler according to any one of the aforementioned aspects; and a drive wheel, an idling wheel and a track roller onto which the elastic crawler is wound.

The elastic crawler device according to the present embodiment is capable of achieving both low fuel consumption and excellent ride comfort.

Advantageous Effect

According to this disclosure, it is possible to provide an elastic crawler and an elastic crawler device capable of achieving both low fuel consumption and excellent ride comfort.

DETAILED DESCRIPTION

In the following, the elastic crawler and the elastic crawler device according to one embodiment of this disclosure is described by referring to the drawings.

In the drawings, the reference sign 1 is an elastic crawler according to one embodiment of this disclosure. The elastic crawler 1 includes an endless belt-like crawler main body (a main body) 2 having elasticity. The crawler main body 2 is a cyclic member formed into a belt-like shape, with the direction of the reference sign W as the crawler width direction, and the direction of the reference sign L as the crawler circumferential direction. In the present embodiment, the crawler main body 2 is formed of a rubber material. In the following description, the reference sign W is a width direction of the crawler main body 2 (hereinafter referred to as the "crawler width direction" as well), which is synonymous to a width direction of the elastic crawler 1. Moreover, the reference sign L is a circumferential direction of the crawler main body 2 (hereinafter referred to as the "crawler circumferential direction" as well), which is synonymous to a circumferential direction of the elastic crawler 1. Furthermore, the reference sign D illustrated in FIG. 5, etc. is a thickness direction of the crawler main body 2 (hereinafter referred to as the "crawler thickness direction" as well), which is synonymous to a thickness direction of the elastic crawler 1.

Figure 3:
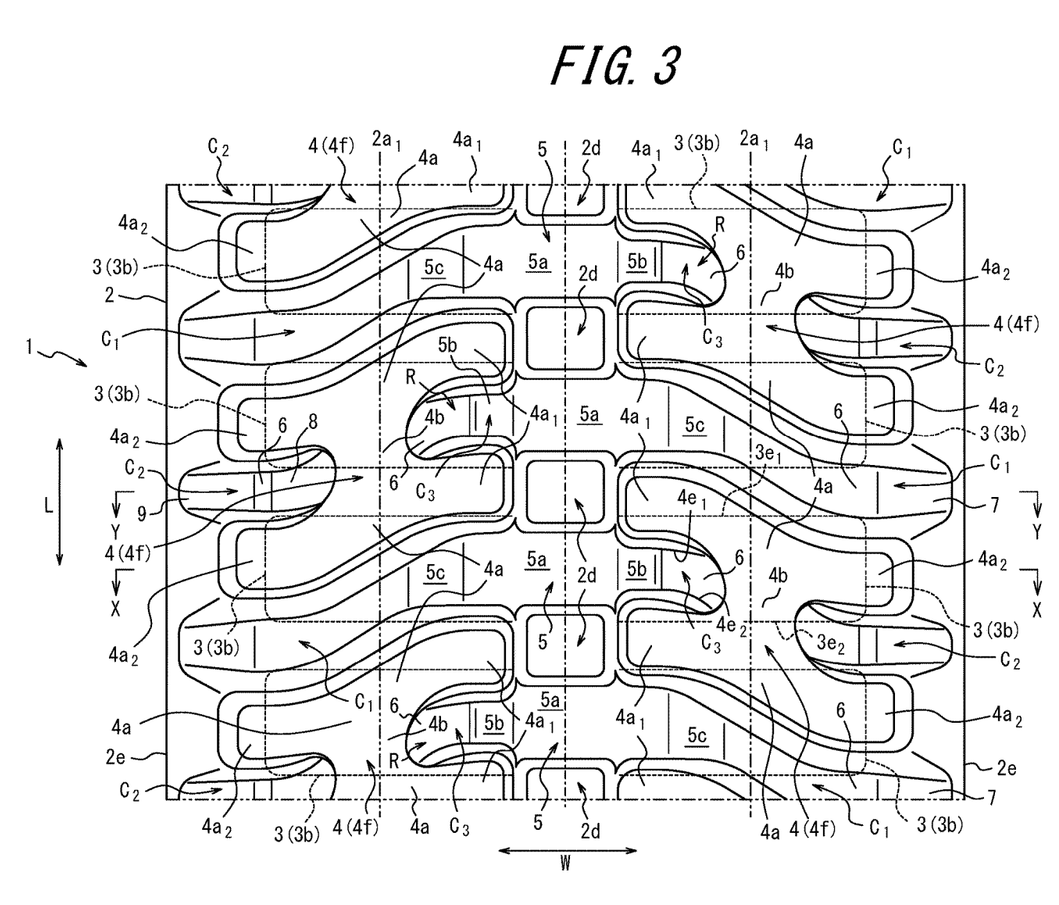
FIG. 3 is a plan view illustrating an outer circumferential surface of the elastic crawler of FIG. 1.
Figure 4:
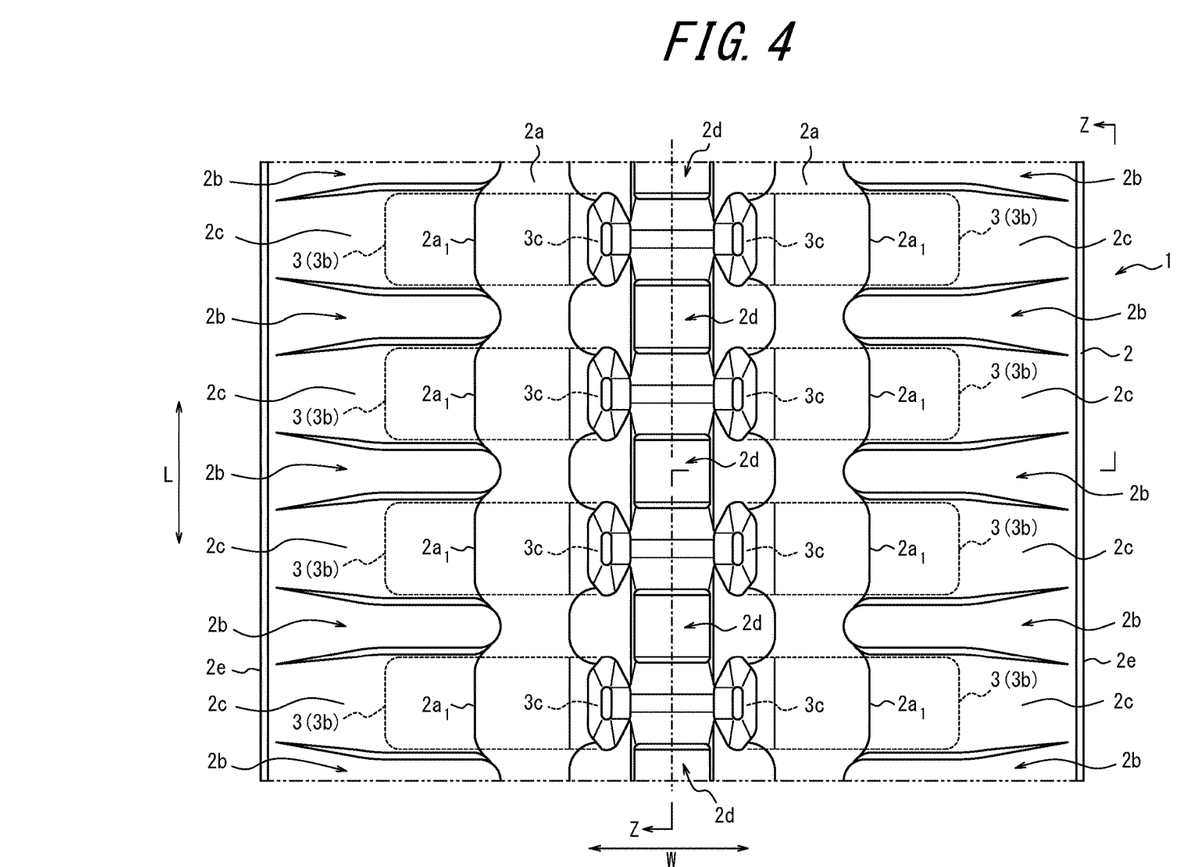
FIG. 4 is a plan view illustrating an inner circumferential surface of the elastic crawler of FIG. 1.
Figure 5:
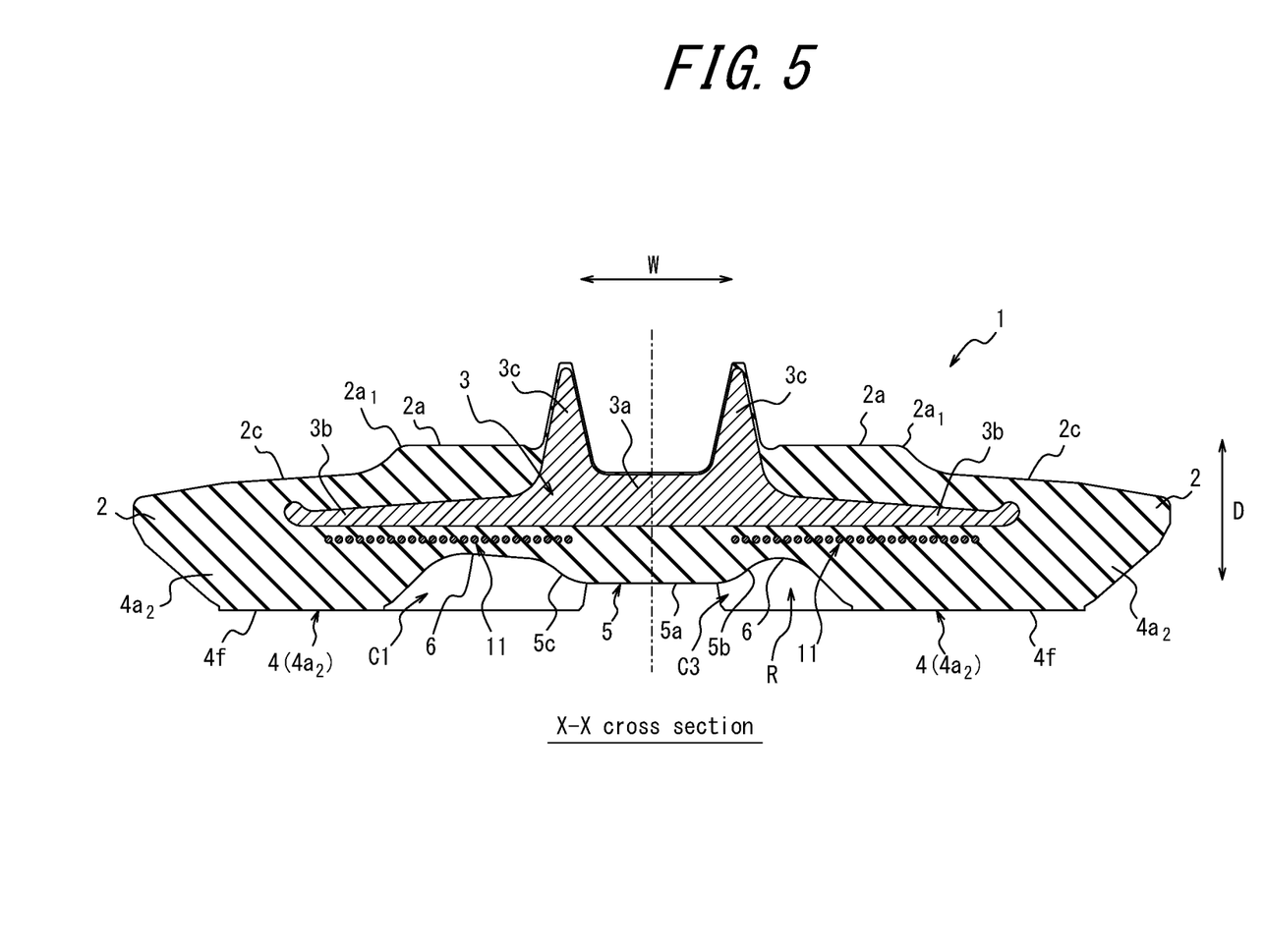
FIG. 5 is an X-X cross-sectional view of FIG. 3.

Moreover, the elastic crawler 1 includes a plurality of cores 3 as illustrated with dashed line in FIGS. 3 and 4. In the present embodiment, as illustrated with dashed line in FIG. 3 and FIG. 4, the plurality of cores 3 are embedded in the crawler main body 2 in a manner spaced from each other in the crawler circumferential direction. Moreover, as illustrated in FIG. 5, each core 3 has a pair of wings 3b extending from a widthwise inner side (hereinafter referred to as only "the widthwise inner side" as well) to crawler widthwise outer sides (hereinafter referred to simply as "the widthwise outer sides" as well) of the crawler main body 2 with the center 3a therebetween, which is a center of the core 3 located at a widthwise center of the crawler main body 2 (hereinafter referred to as only "the widthwise center" as well). Moreover, pairs of projections 3c are arranged at the centers 3a of the cores 3 in a manner spaced from each other in the width direction. In the present embodiment, as illustrated in FIG. 5, a main cord layer 11 is arranged on a lower side (an outer circumferential surface side of the crawler main body 2) of the wings 3b of the cores 3. The main cord layer 11 is formed by, for example, arranging a plurality of steel cords running circumferentially through the crawler main body 2, in a manner spaced from each other in the width direction.

Specifically, as illustrated in FIG. 4, a track roller rolling surface 2a extending in the crawler circumferential direction and circling the crawler main body 2 is formed on an inner circumferential surface of the crawler main body 2. In the present embodiment, a pair of track roller rolling surfaces 2a is formed in a manner spaced from each other on a central side in the width direction of the inner circumferential surface of the crawler main body 2. As illustrated in FIGS. 2 and 4 to 7, the track roller rolling surfaces 2a respectively form flat surfaces.

Figure 6:
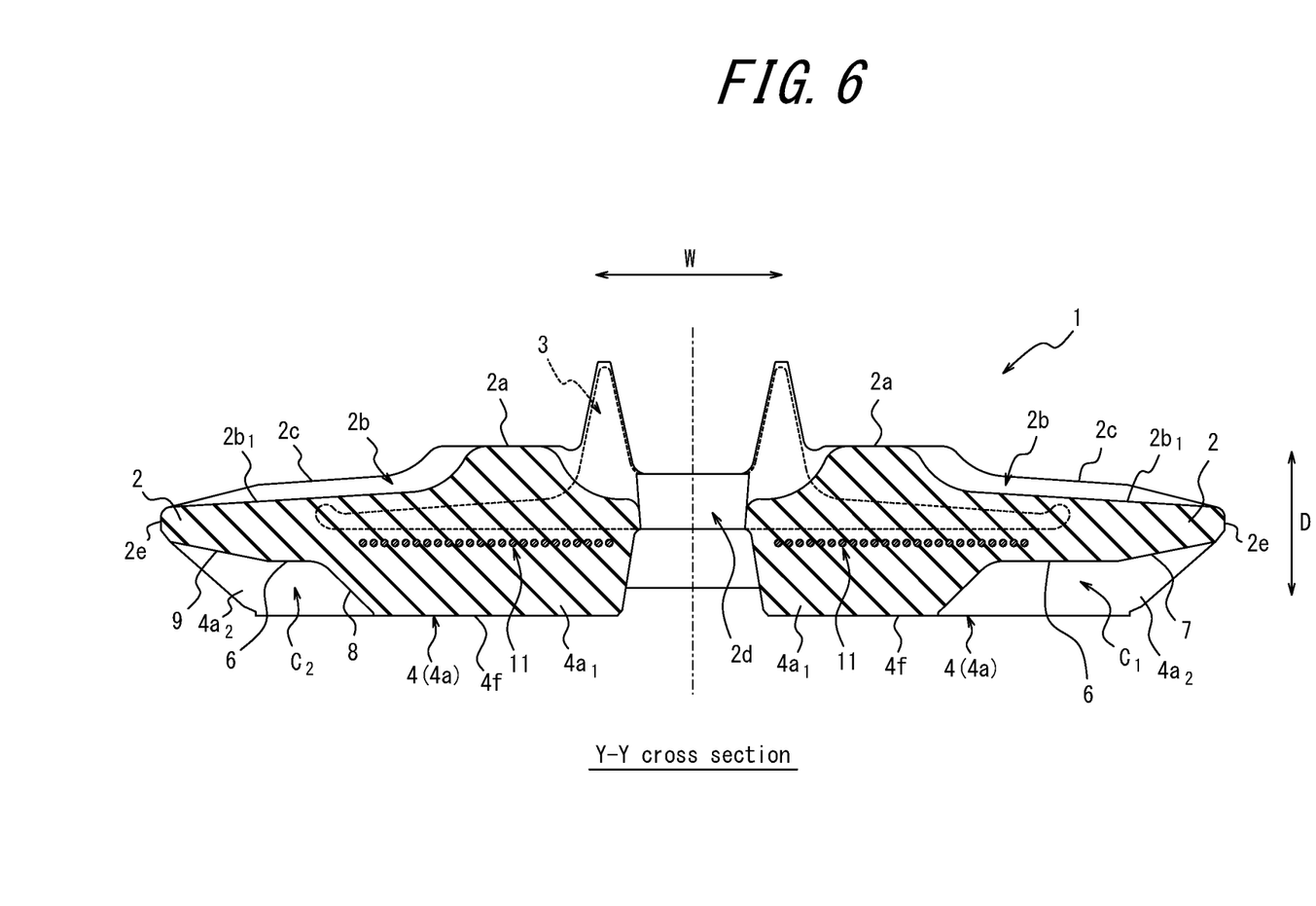
FIG. 6 is a Y-Y cross-sectional view of FIG. 3.
Figure 7:
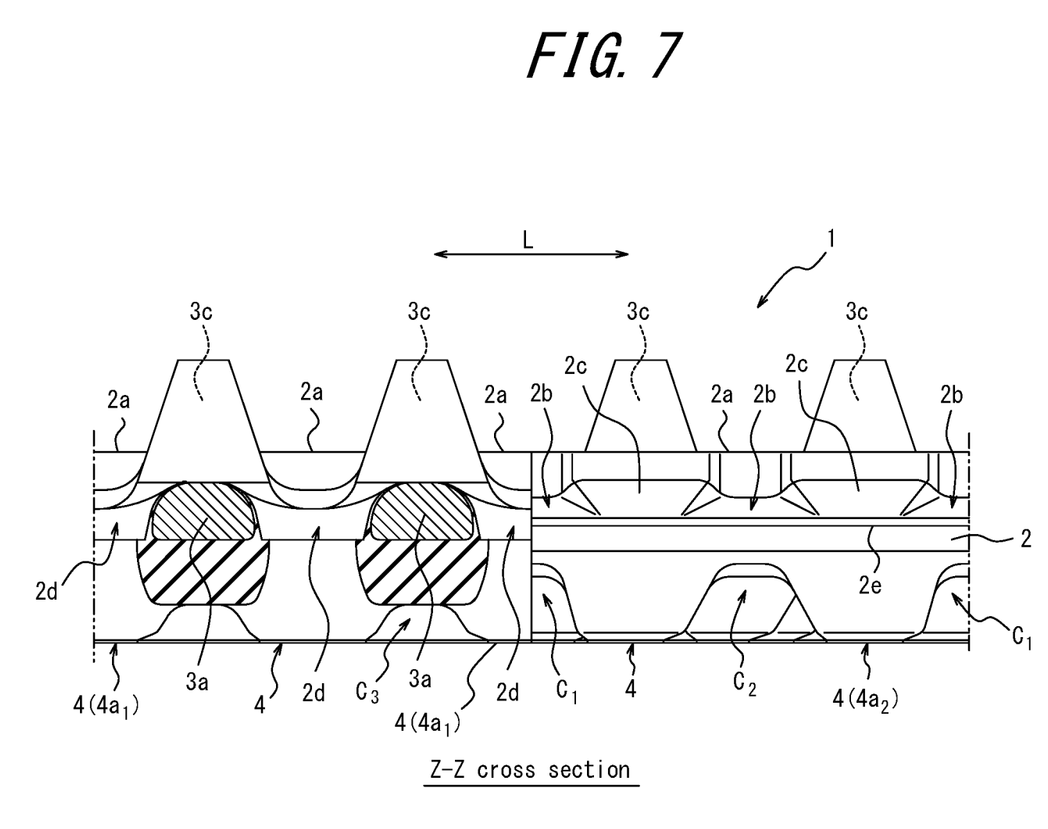
FIG. 7 is a side view illustrating a part of the elastic crawler of FIG. 1 in a Z-Z cross section of FIG. 4.

As illustrated in FIG. 4, on the inner circumferential surface of the crawler main body 2, recesses 2b extending between the wings 3b of the cores 3 adjacent in the crawler circumferential direction from the track roller rolling surfaces 2a toward widthwise outer sides are formed in a manner spaced from each other in the circumferential direction. In the present embodiment, as illustrated in FIG. 4, in a circumferential view of the crawler main body 2, the recesses 2b are formed between portions 2c of the crawler main body 2 in which the wings 3b of the cores 3 are embedded (hereinafter referred to as the "core wing-embedded portions" as well). Moreover, in the present embodiment, as illustrated in FIG. 4, the recesses 2b respectively have a shape with a length extending in the crawler circumferential direction of the recess 2b (a crawler circumferential width of the recess 2b) increasing toward widthwise edges 2e of the crawler main body 2. Furthermore, in the present embodiment, as illustrated in FIG. 6, a bottom surface $2b_1$ of each recess 2b is inclined in a manner closer to the outer circumferential surface of the crawler main body 2 toward the widthwise edges 2e of the crawler main body 2 in the crawler thickness direction.

As illustrated in FIG. 4, in the present embodiment, on the inner circumferential surface of the crawler main body 2, a plurality of engaging portions 2d mentioned below are formed at the crawler widthwise center in a manner spaced from each other in the crawler circumferential direction. The engaging portions 2d are formed so as to be respectively in a line in the crawler width direction with the recesses 2b formed on the inner circumferential surface of the crawler main body 2. Namely, the engaging portions 2d are formed at positions corresponding, in the crawler circumferential direction, to the recesses 2b formed on the inner circumferential surface of the crawler main body 2.

Figure 1:
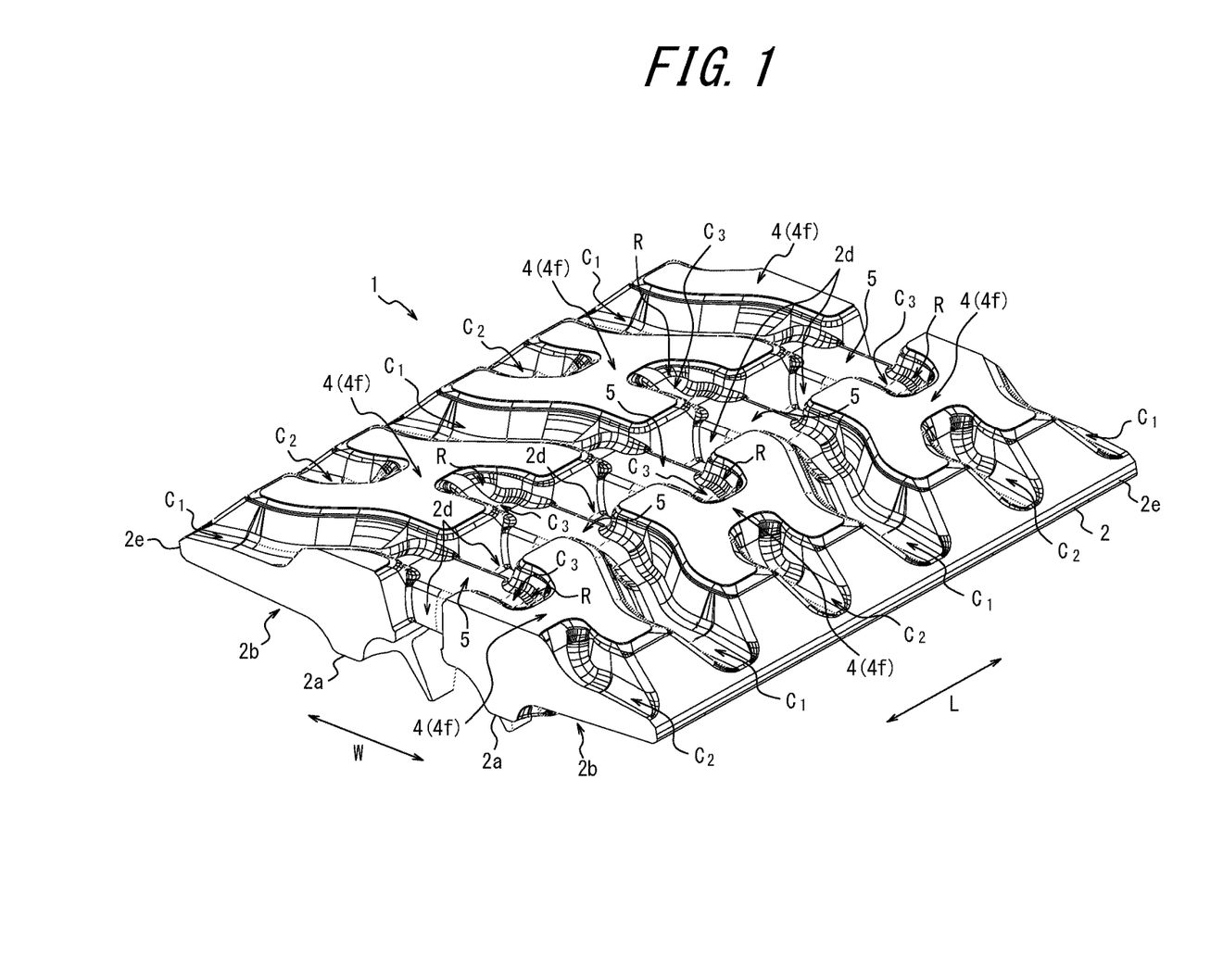
FIG. 1 is a partial perspective view illustrating a partial cross section of an elastic crawler according to one embodiment of this disclosure from an outer circumferential surface side of the elastic crawler.

As illustrated in FIG. 1, the elastic crawler 1 includes a plurality of composite lugs 4. In the present embodiment, the composite lugs 4 are formed of a rubber material. The composite lugs 4 may be, for example, respectively formed by performing vulcanization adhesion on the outer circumferential surface of the crawler main body 2, or formed integrally with the crawler main body 2. The composite lugs 4 are respectively formed on the outer circumferential surface of the crawler main body 2. As illustrated in FIG. 3, in the present embodiment, composite lugs 4 are arranged in pairs, one on either side of the corresponding engaging portion 2d, in a manner spaced from each other in the crawler width direction. Moreover, multiple pairs of such composite lugs 4, one on either side in the crawler width direction of the corresponding engaging portion 2d, are arranged in a manner spaced from each other in the crawler circumferential direction. In the present embodiment, the multiple pairs of composite lugs 4 form gaps $C_1$ extending in the crawler width direction between the composite lugs 4 adjacent in the crawler circumferential direction.

Moreover, in the present embodiment, each composite lug 4 has a pair of lugs 4a adjacent in the crawler circumferential direction. The pairs of lugs 4a are arranged in a manner spaced from each other in the crawler circumferential direction. In FIG. 3, widthwise outermost edges $2a_1$ of the track roller rolling surfaces 2a formed on the inner circumferential surface of the crawler main body 2 are illustrated with two-dot chain line. Each lug 4a has an inner end (one end) $4a_1$ overlapping the track roller rolling surfaces 2a in the crawler thickness direction and an outer end (other end) $4a_2$ overlapping the core wing-embedded portions 2c in the crawler thickness direction, and extends in the crawler width direction. In the present embodiment, in a planar view as illustrated in FIG. 3, the lugs 4a have a shape extending in the crawler width direction so as to be displaced in the crawler circumferential direction toward the crawler widthwise outer sides. Thereby, the inner end $4a_1$ and the outer end $4a_2$ of each lug 4a are arranged at positions displaced in the crawler circumferential direction. Furthermore, in the present embodiment, each composite lug 4 has a connecting lug 4b being formed between the lugs 4a adjacent in the crawler circumferential direction and connecting these lugs 4a.

The core wing-embedded portions $2c$ formed on the inner circumferential surface of the crawler main body 2 as illustrated in FIG. 4 correspond to the portions at which the wings $3b$ of the cores 3 illustrated with dashed line in FIG. 3 are located, and spaces between the wings $3b$ of the cores 3 illustrated with dashed line in FIG. 3 correspond to the recesses $2b$ formed on the inner circumferential surface of the crawler main body 2 as illustrated in FIG. 4.

As illustrated in FIG. 3, the present embodiment includes the connecting lugs $4b$, so as to form notched portions $C_2$ respectively formed by two lugs $4a$ adjacent in the crawler circumferential direction and one connecting lug $4b$ connecting them at the positions overlapping the recesses $2b$ in the crawler thickness direction. In the present embodiment, as illustrated in FIG. 3, the notched portions $C_2$ are formed between the cores 3 adjacent in the crawler circumferential direction, so as to be open to the crawler widthwise outer sides. Furthermore, as illustrated in FIG. 3, the present embodiment includes the composite lugs 4, so as to form open portions $C_3$ respectively formed by two lugs $4a$ adjacent in the crawler circumferential direction and one connecting lug $4b$ at the positions overlapping the track roller rolling surfaces $2a$ and the core 3 in the crawler thickness direction. In the present embodiment, as illustrated in FIG. 3, the open portions $C_3$ are formed above the cores 3 adjacent in the crawler circumferential direction, so as to be open to the crawler widthwise central side. Note that in the present embodiment, the open portions $C_3$ formed between the inner ends $4a_1$ of the pairs of lugs $4a$ of the composite lugs 4 are constituted as gaps respectively narrower in the crawler circumferential direction than the gaps $C_1$ formed between the inner ends $4a_1$ of the composite lugs 4 at the same positions in the crawler width direction, but may be gaps wider than the same as well.

In the present embodiment, as illustrated in FIG. 3, composite lugs 4 are arranged in pairs, one on either side in the crawler width direction, at positions displaced in the crawler circumferential direction from each other with respect to the engaging portions $2d$ formed on the inner circumferential surface of the crawler main body 2. Specifically, as illustrated in FIG. 3, the inner end $4a_1$ of the lug $4a$ on one side in the crawler circumferential direction of the composite lug 4 on the right side and the inner end $4a_1$ of the lug $4a$ on the other side in the crawler circumferential direction of the composite lug 4 on the left side are arranged so as to be in a line with each engaging portion $2d$ of the crawler main body 2 in the crawler width direction W.

As illustrated in FIG. 6, the gaps $C_1$ and the notched portions $C_2$ formed between the outer ends $4a_2$ of lugs $4a$ respectively overlap the recesses $2b$ (in the present embodiment, at least a part of the recesses $2b$ in the crawler width direction) formed on the inner circumferential surface of the crawler main body 2 in the crawler thickness direction, and locally reduces the crawler thickness. Thereby, the gaps $C_1$ and the notched portions $C_2$ respectively collaborate with the recesses $2b$ formed on the inner circumferential surface of the crawler main body 2 to allow the elastic crawler 1 to easily bend to a sufficient extent. Moreover, as illustrated in FIG. 6, the inner ends $4a_1$ of each lug $4a$ (in the present embodiment, at least a part of the inner ends $4a_1$ in the crawler width direction) overlap the track roller rolling surfaces $2a$ in the crawler thickness direction. Thereby, as illustrated in FIG. 6, the inner portions $4a_1$ of the lugs $4a$ respectively support the track roller rolling surfaces $2a$.

Figure 2:
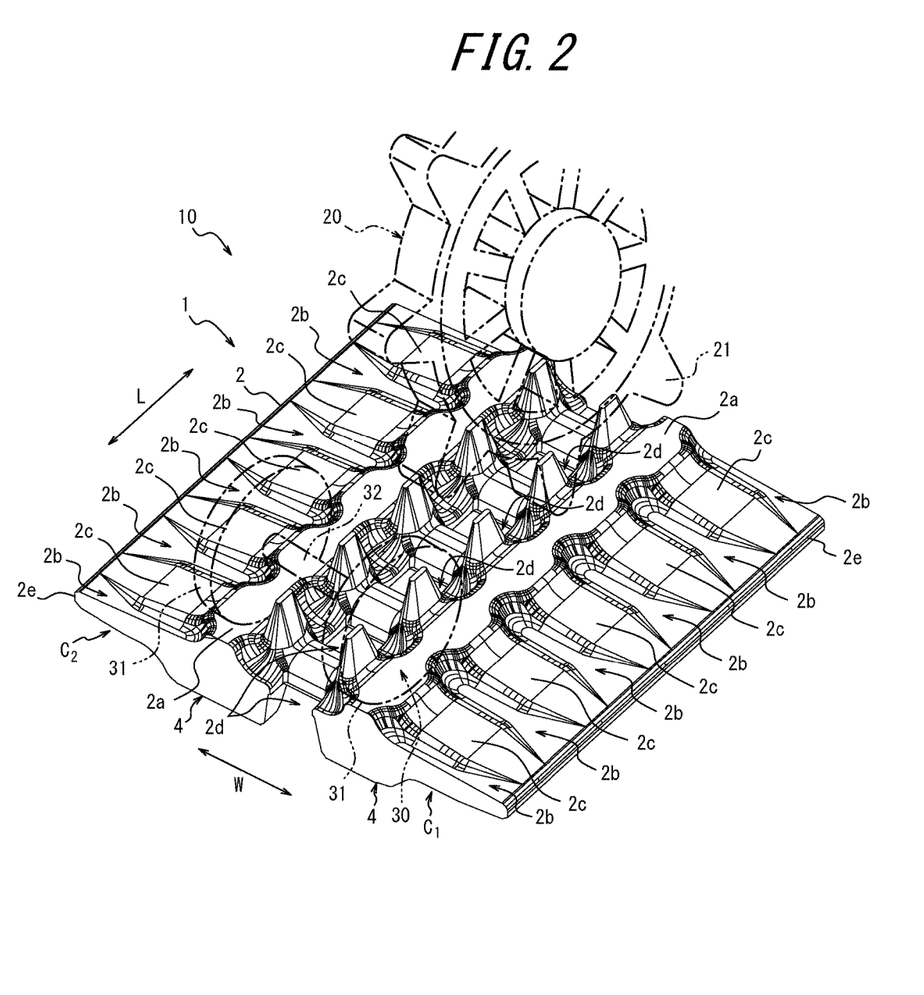
FIG. 2 is a partial perspective view illustrating a partial cross section of the elastic crawler of FIG. 1 together with virtually illustrated sprocket and idler from an inner circumferential surface side of the elastic crawler.

FIG. 2 illustrates a basic configuration of the elastic crawler device 10 according to the one embodiment of this disclosure, with the aforementioned elastic crawler 1 as a constituent member. The elastic crawler device 10 includes: the aforementioned elastic crawler 1, and a drive wheel, and idling wheel and a track roller onto which the elastic crawler 1 is wound.

In FIG. 2, the reference sign 20 is a sprocket or an idler constituting the elastic crawler device 10. In the present embodiment, the sprocket 20 constitutes the drive wheel, and the idler 20 constitutes the idling wheel. As illustrated in FIG. 2, the sprocket 20 has teeth 21 engaged with the engaging portions $2d$ to drive the elastic crawler 1, and the idler 20 is driven by the elastic crawler 1 driven by the sprocket 20. In the present embodiment, the engaging portions $2d$ are formed by through holes penetrating in the crawler thickness direction, but may also be cavities without penetrating in the crawler thickness direction.

The reference sign 30 is a track roller constituting the elastic crawler device 10. In the elastic crawler 1, the track roller 30 rotates on the track roller rolling surface $2a$ formed on the inner circumferential surface of the crawler main body 2. In the present embodiment, the track roller 30 has two track rollers 31 connected via a shaft 32.

In the elastic crawler 1 according to the present embodiment, the plurality of recesses $2b$ are formed on the inner circumferential surface of the crawler main body 2, the recesses $2b$ extending between the wings $3b$ of the cores 3 adjacent in the crawler circumferential direction from the track roller rolling surfaces $2a$ toward the crawler widthwise outer sides. The recesses $2b$ are respectively formed in a manner spaced from each other in the circumferential direction, in parts without existence of the cores 3 extending in the crawler width direction. Furthermore, on the outer circumferential surface of the crawler main body 2, the plurality of lugs $4a$ are formed, the lugs $4a$ extending in the crawler width direction between the cores 3 adjacent in the circumferential direction, from the inner ends $4a_1$ overlapping the track roller rolling surfaces $2a$ in the crawler thickness direction toward the outer ends $4a_2$ overlapping the parts in which the wings $3b$ of the cores 3 are embedded in the crawler thickness direction.

Namely, in the elastic crawler 1 according to the present embodiment, between the cores 3 adjacent in the crawler circumferential direction, in other words, in the parts without existence of the cores 3 extending in the crawler width direction, the inner ends $4a_1$ of the lugs $4a$ are arranged on the crawler widthwise inner sides, while some of the gaps $C_1$ formed between the outer ends $4a_2$ of the lugs $4a$ adjacent in the circumferential direction, i.e., between the composite lugs 4 adjacent in the circumferential direction, are arranged on the crawler widthwise outer sides (inclusive of the notched portions $C_2$ formed by the connecting lugs $4b$ in the present embodiment).

In this case, on the crawler widthwise outer sides, by arranging the gaps $C_1$ and the notched portions $C_2$ shaped by the lugs $4a$ formed on the outer circumferential surface of the crawler main body 2 at positions overlapping the recesses $2b$ formed on the inner circumferential surface of the crawler main body 2 in the crawler thickness direction, the crawler main body 2 (the elastic crawler 1) is allowed to bend easily when the elastic crawler 1 is driven, and thus it is possible to reduce the power loss during running, and to improve the fuel efficiency. Moreover, on the crawler widthwise inner side, by arranging the inner ends $4a_1$ of the lugs $4a$ at the positions overlapping the recesses $2b$ formed on the inner circumferential surface of the crawler main body 2 in the crawler thickness direction, the elastic crawler 1 is allowed to bend easily, and the spring becomes stiffer at positions between cores 3 adjacent in the circumferential direction (in the parts in which the inner ends $4a_1$ of the lugs $4a$ are arranged, the difference in spring force between each core wing-embedded portion $2c$ and the space between the core wing-embedded portions $2c$ is reduced). Thereby, the vibration during running is suppressed, which improves the ride comfort.

Therefore, the elastic crawler 1 according to the present embodiment is capable of achieving both reduction of bending resistance of the elastic crawler 1 and suppression of the vibration, and thus is capable of achieving both low fuel consumption and excellent ride comfort.

According to the elastic crawler 1 according to the present embodiment, due to the connecting lugs $4b$ being formed between the lugs $4a$ adjacent in the crawler circumferential direction and connecting the lugs $4a$, as compared to the case of using a single lug $4a$, the volume of each lug is increased, and thus it is possible to improve the durability of the lugs.

In particular, the elastic crawler 1 according to the present embodiment includes the connecting lugs $4b$, so as to form the notched portions $C_2$ formed by the lugs $4a$ adjacent in the crawler circumferential direction and the connecting lugs $4b$ at the positions overlapping the recesses $2b$ formed on the inner circumferential surface of the crawler main body 2 in the crawler thickness direction. In this case, since the notched portions $C_2$ formed on the composite lugs 4 adjacent in the crawler circumferential direction exist as the gaps $C_1$ formed between the lugs $4a$ adjacent in the crawler circumferential direction, and overlap the recesses $2b$ formed on the inner circumferential surface of the crawler main body 2 in the crawler thickness direction, the rigidity of the lugs $4a$ is improved as the rigidity of the entire composite lugs 4, and the crawler main body 2 (the elastic crawler 1) is allowed to bend easily. Thereby, it is possible to improve the durability of the lugs, and to simultaneously further reduce the fuel consumption.

The elastic crawler 1 according to the present embodiment includes the connecting lugs $4b$, so as to form the open portions $C_3$ formed by the lugs $4a$ adjacent in the crawler circumferential direction and the connecting lugs $4b$ at the positions overlapping the track roller rolling surfaces $2a$ formed on the inner circumferential surface of the crawler main body 2 and the cores 3 in the crawler thickness direction. In this case, it is possible to reduce the difference in spring force between the parts in which the cores 3 are embedded and the parts without existence of the cores 3, and thus it is possible to improve the durability of the lugs, and to simultaneously improve the ride comfort.

The elastic crawler device 10 according to the present embodiment is capable of achieving both low fuel consumption and excellent ride comfort.

As mentioned above, this disclosure is capable of providing an elastic crawler and an elastic crawler device capable of achieving both low fuel consumption and excellent ride comfort.

The elastic crawler 1 includes, on the outer circumferential surface sides of the crawler main body 2, a plurality of lugs raised from the outer circumferential surface of the crawler main body 2 and respectively surrounding predetermined regions R overlapping the cores 3 in a crawler thicknesswise view. Here, "surrounding" is inclusive of not only the case where the regions R are surrounded spanning the entire circumference, but also the case where only one side of the regions R is open. Specific examples include the case where the regions R are surrounded spanning a half or more of the circumference, more specifically, the regions R are surrounded spanning ⅔ or more of the circumference. In the present embodiment, for example, as illustrated in FIGS. 1 and 3, the lugs include: the composite lugs 4 (lugs) as ground-contacting lugs arranged on the outer circumferential surface side of the crawler main body 2, and on both sides in the crawler width direction of the centers of the cores 3 in the crawler width direction in a crawler thicknesswise view; and central lugs (lugs) 5 overlapping the centers of the cores 3 in the crawler width direction in a crawler thicknesswise view.

In the present embodiment, the central lugs 5 are formed of a rubber. The central lugs 5 may be, for example, respectively formed by performing vulcanization adhesion on the outer circumferential surface of the crawler main body 2, or formed integrally with the crawler main body 2.

In the present embodiment, as illustrated in FIG. 4, the wings $3b$ of the cores 3 illustrated with dashed line in FIG. 3 are arranged at positions overlapping the core wing-embedded portions $2c$ in a crawler thicknesswise view, and spaces between the wings $3b$ of the cores 3 illustrated with dashed line in FIG. 3 in the crawler circumferential direction are arranged at positions overlapping the recesses $2b$ formed on the inner circumferential surface of the crawler main body 2 in a crawler thicknesswise view.

In the present embodiment, in each lug $4a$, a part inclusive of the inner end $4a_1$ of the lug $4a$ is a part closer to the center in the crawler width direction than the connecting lug $4b$, and a part inclusive of the outer end $4a_2$ of the lug $4a$ is a part on a crawler widthwise side outer than the connecting lug $4b$. Thereby, as illustrated in FIG. 3, the composite lugs 4 respectively form the regions R having an open portion $C_3$ partitioned by one connecting lug $4b$ and the part inclusive of the inner ends $4a_1$ of two lugs $4a$, at a position overlapping one track roller rolling surface $2a$ and one core 3 in a crawler thicknesswise view. Moreover, the composite lugs 4 respectively form a notched portion $C_2$ partitioned by the connecting lug $4b$ and the part inclusive of the outer ends $4a_2$ of two lugs $4a$, at a position overlapping a space between two cores 3 in the crawler circumferential direction in a crawler thicknesswise view. Moreover, in the present embodiment, each one connecting lugs $4b$ and two lugs $4a$ are raised to the same height in the crawler thickness direction, so that contact patches $4f$ of the composite lugs 4 are formed as one plane.

Note that in the present embodiment, the open portions $C_3$ formed between the inner sides $4a_1$ of each pair of the lugs $4a$ of the composite lugs 4 are formed as gaps respectively narrower in the crawler circumferential direction than the gaps $C_1$ formed between the composite lugs 4 in the crawler circumferential direction at the same positions in the width direction of the crawler main body 2, but may be gaps wider than the same as well.

Next, the central lugs 5 are described. In the present embodiment, the central lugs 5 overlap centers of the cores 3 in the crawler width direction in a crawler thicknesswise view, and connect the inner ends $4a_1$ of each two lugs $4a$ adjacent in the crawler circumferential direction among the composite lugs 4. Thereby, in the present embodiment, the regions (predetermined regions) R respectively surrounded by the parts inclusive of the inner ends $4a_1$ of the two lugs $4a$, the connecting lugs $4b$ and the central lugs 5 are formed at positions overlapping the cores 3 in a crawler thicknesswise view.

More specifically, in the present embodiment, for example, as illustrated in FIG. 5, when a part of each region R closest to each core 3 in the crawler thickness direction is defined as a bottom surface 6 of the region R, each central lug 5 is raised to a position which is on a side closer to the contact patch 4f of each composite lug 4 than the bottom surface 6 of the region R and which matches the contact patch 4f of the composite lug 4 or closer to the core 3 than the contact patch 4f. A maximum raised surface 5a of each central lug 5 is formed at this position. Moreover, each central lug 5 has an open portion side inclined surface 5b, which is continuous to the maximum raised surface 5a and is closer to each core 3 toward the crawler widthwise outer side. Namely, in the present embodiment, each region R is a region surrounded by the contact patch 4f of each composite lug 4 and the maximum raised surface 5a of each central lug 5, with the bottom surface 6 as a deepest portion. In particular, with a height lower than the contact patch 4f of the composite lug 4, the maximum raised surface 5a of the central lug 5 opens only one side of the region R in a crawler thicknesswise view.

In the present embodiment, a direction in which the open portions $C_3$ open the regions R is a direction extending along the crawler width direction, more specifically, a direction extending along the crawler width direction toward a central side in the crawler width direction (the crawler widthwise inner side). In the present embodiment, as illustrated in FIG. 3, each open portion $C_3$ is formed above each core 3 in a crawler thicknesswise view so as to open to the crawler widthwise central side.

In the present embodiment, as illustrated in FIG. 3, the composite lugs 4 are arranged in pairs, one on either side in the crawler width direction, at positions displaced from each other with respect to the corresponding engaging portions 2d formed on the crawler main body 2 at a spacing of two engaging portions 2d in the crawler circumferential direction. Specifically, as illustrated in FIG. 3, the inner end $4a_1$ on one side in the crawler circumferential direction among the inner ends $4a_1$ of the two lugs 4a of each composite lug 4 on the right side of the drawing and the inner end $4a_1$ on the other side in the crawler circumferential direction among the inner ends $4a_1$ of the two lugs 4a of each composite lug 4 on the left side of the drawing are arranged so as to be in a line with each engaging portion 2d of the crawler main body 2 in the crawler width direction.

Specifically, between two engaging portions 2d of the crawler main body 2 adjacent to each other in the crawler circumferential direction, a gap $C_1$ formed between the composite lugs 4 adjacent in the crawler circumferential direction and a region R having an open portion $C_3$ are arranged on opposite sides of an engaging portion 2d so as to face each other.

As illustrated in FIG. 5, the gaps $C_1$ formed between the composite lugs 4 adjacent to each other in the crawler circumferential direction are respectively continuous to the maximum raised portions 5a of the central lugs 5, and respectively have a groove side inclined surface 5c closer to the cores 3 toward the crawler widthwise outer side. As illustrated in FIG. 5, the groove side inclined surfaces 5c are continuous to the bottom surfaces 6. The groove side inclined surfaces 5c may be inclined at an angle either identical to or different from the open portion side inclined surfaces 5b. As illustrated in FIG. 6, the bottom surfaces 6 of the gaps $C_1$ are continuous to inclined surfaces 7 inclined in a manner closer to the cores 3 toward the widthwise edges 2e of the crawler main body 2. The gaps $C_1$ are capable of improving the bendability between the cores 3 in the crawler circumferential direction and reducing running vibration on the crawler widthwise outer sides, while allowing snow, etc. compacted between the composite lugs 4 to escape to the crawler widthwise outer sides.

Further, as illustrated in FIGS. 3, 6, etc., the notched portions $C_2$ are formed on the crawler widthwise outer sides of the composite lugs 4. The notched portions $C_2$ of the composite lugs 4 formed between the pairs of outer ends $4a_2$ of the lugs 4a are respectively formed by: a first inclined surface 8 continuous to the contact patch 4f of the composite lug 4, and inclined in a manner closer to the core 3 from the contact patch 4f toward the widthwise edge 2e of the crawler main body 2; a bottom surface 6 continuous to the first inclined surface 8 and at a height identical to the bottom surface 6 of the region R; and a second inclined surface 9 continuous to the bottom surface 6 and inclined in a manner closer to the core 3 toward the widthwise edge 2e of the crawler main body 2. Moreover, in the present embodiment, the notched portions $C_2$ of the composite lugs 4 formed between the pairs of the outer ends $4a_2$ of the lugs 4a are open to the crawler widthwise outer sides. The notched portions $C_2$ are constituted as gaps respectively narrower in the crawler circumferential direction than the open portions $C_3$ formed between the inner ends $4a_1$ of the composite lugs 4 at the same positions in the crawler width direction.

In the present embodiment, when running on snow, soft ground, etc., as illustrated in FIG. 3, etc., by compacting and hardening the snow or soft ground with the regions R surrounded by the composite lugs 4 and the central lugs 5, the packing performance is improved, and since the regions R surrounded by the composite lugs 4 and the central lugs 5 are at the positions overlapping the cores 3 in a crawler thicknesswise view, the snow or soft ground can be compacted in the regions R by the cores 3 together with the load from the vehicle body. In this way, the elastic crawler 1 according to the present embodiment is capable of increasing a force compacting the snow or soft ground with the core 3, and thereby improving the packing performance. Therefore, the elastic crawler 1 according to the present embodiment is capable of improving the packing performance, and improving transmission of the driving force to snow, soft ground, etc.

The elastic crawler 1 according to the present embodiment includes open portions $C_3$ opening the regions R in only one direction. In this case, snow, mud, etc. stuck in the regions R can be easily removed from the open portions $C_3$, or alternatively, snow, mud, etc. stuck in the regions R can be easily removed in response to the lugs 4 deforming relative to the open portions $C_3$, and thus it is possible to suppress deterioration of the packing performance due to continuous use of the elastic crawler 1. In particular, in the present embodiment, by compacting with the regions surrounded by the composite lugs 4 (the connecting lugs 4b and the parts inclusive of the inner ends $4a_1$) and the central lugs 5, and compacting with the regions surrounded by the composite lugs 4 (the connecting lugs 4b and the parts inclusive of the inner ends $4a_1$), it is possible to further improve the packing performance, and due to movement of the composite lugs 4 (in particular, the parts inclusive of the inner ends $4a_1$) relative to the open portions $C_3$ formed on the central side in the crawler width direction of the composite lugs 4, it is possible to remove snow, mud, etc. stuck in the regions R.

In particular, in the elastic crawler 1 according to the present embodiment, the direction in which the open portions $C_3$ open the regions R is the direction extending along the crawler width direction. In this case, it is possible to suppress lateral slip.

In the elastic crawler 1 according to the present embodiment, the direction in which the open portions $C_3$ open the regions R is the direction extending along the crawler width direction toward the central side in the crawler width direction. In this case, since escape of a compacted part to the crawler widthwise outer side is suppressed, compacted snow, etc. is allowed to escape toward the center in the crawler width direction, where the load from the vehicle body is large. Thereby, the packing performance during running is improved, which enables further improvement of transmission of the driving force to snow, soft ground, etc. and further suppression of lateral slip.

Furthermore, according to the present embodiment, in the elastic crawler 1, it is preferable that some of the lugs surrounding the predetermined regions R are central lugs 5 overlapping the centers of the cores 3 in the crawler width direction in a crawler thicknesswise view. In the present embodiment, some of the lugs surrounding the predetermined regions R are central lugs 5 overlapping the centers 3a of the cores 3 in the crawler width direction. In this case, by arranging the central lugs 5 at the centers of the cores 3, the regions R are surrounded by the central lugs 5 which carry the largest load such as the load from the vehicle body, and thus the packing performance may be further improved.

In the elastic crawler 1 according to the present embodiment, it is preferable that the lugs extend spanning a plurality of the cores 3 adjacent in the crawler circumferential direction in a crawler thicknesswise view. In the present embodiment, the two widthwise lug portions 4a of each composite lug 4 respectively extend spanning a plurality of the cores 3 adjacent in the crawler circumferential direction in a crawler thicknesswise view. In this case, by increasing the volume of each composite lug 4, and increasing the area of the contact patches 4f of the lugs 4, transmission of the driving force to snow, soft ground, etc. is improved, occurrence of slip on low-friction road such as snowy road is suppressed, and phenomena such as abrasion and rubber chipping are suppressed as well. Namely, it is possible to achieve both the durability of the lugs and the running performance on snow, soft ground, etc.

As illustrated in FIG. 3, etc., the elastic crawler 1 according to the present embodiment includes the lugs surrounding the regions R and the gaps $C_1$ such that each lug and the corresponding gap face each other across the center in the crawler width direction. In this case, it is possible to improve the packing performance and to simultaneously suppress the running vibration.

As a variation of the elastic crawler 1 according to the present embodiment, it is preferable as well that the elastic crawler 1 includes lugs and regions R such that respective two of the lugs surround respective two regions R spaced from each other in the crawler width direction, and the open portions $C_3$ of the respective two of the lugs opening the regions R face each other. Specifically, the two composite lugs 4 are arranged symmetrically in pairs across the line of symmetry, which is a central line extending in the crawler circumferential direction through the center in the crawler width direction. In this case, the two open portions $C_3$ are arranged in a line in a manner spaced from each other in the crawler width direction, and these open portions $C_3$ are open toward the same central lug 5. In this case, together with the snow in the two regions R facing each other in the crawler width direction, the snow on the maximum raised portions 5a of the central lugs 5 is compacted from the outer sides toward the center in the crawler width direction, so as to be sandwiched in the crawler width direction by the two composite lugs 4 and the central lugs 5 surrounding the regions R. Therefore, it is possible to further improve transmission of the driving force to snow, soft ground, etc., and to further suppress the lateral slip.

In the present embodiment, as illustrated in FIG. 3, edges 4e1, 4e2 of the regions R in the crawler circumferential direction are respectively located in the crawler circumferential direction between edges 3e1, 3e2 of the cores 3 in the crawler circumferential direction. In this case, in a crawler thicknesswise view, the composite lugs 4 are located at positions surely overlapping the cores 3, which have a higher rigidity as compared to the elastic body. Therefore, it is possible to compact snow with a stronger force, and to further improve the packing performance. Further, in the elastic crawler 1 according to the present embodiment, it is preferable as well that at least one edge of each region R in the crawler circumferential direction is in accordance with at least one edge of each core 3 in the crawler circumferential direction in a crawler thicknesswise view. In this case, when wound onto the sprocket or the idler of the elastic crawler 1, the composite lugs 4 are bent relative to the edges 3e1 and 3e2 of the cores 3 in the crawler circumferential direction, and thus dirt, etc. stuck in the regions R can be easily removed. Therefore, it is possible to suppress deterioration of the packing performance due to continuous use of the elastic crawler 1.

In another variation of the elastic crawler 1 according to the present embodiment, it is preferable that the lugs surround the regions R in all directions. As a specific example, the regions R may be surrounded in all directions by the composite lugs 4 and the central lugs 5 by setting the maximum raised portion 5a of the central lugs 5 at the same height as the contact patches 4f of the composite lugs 4, or alternatively, the regions R may be surrounded in all directions with only the composite lugs 4 by using recesses formed on the composite lugs 4 as the regions R. In this case as well, it is possible to improve transmission of the driving force to snow, soft ground, etc. by improving the packing performance.

According to this disclosure, it is possible to provide an elastic crawler with improved packing performance during running.

INDUSTRIAL APPLICABILITY

This disclosure can be used in an elastic crawler and an elastic crawler device comprising: an endless belt-like main body having elasticity; a plurality of cores respectively having a pair of wings embedded in a manner spaced from each other in a circumferential direction of the main body, the wings extending from a widthwise inner side of the main body toward widthwise outer sides of the main body; a track roller rolling surface formed on an inner circumferential surface of the main body in a manner extending in the circumferential direction of the main body; and a plurality of lugs formed on an outer circumferential surface of the main body.

REFERENCE SIGNS LIST 1 elastic crawler
2 crawler main body (main body)
2a track roller rolling surface
2b recess
2c part in which wing of core is embedded
2d engaging portion
3 core
3a center
3b wing
4 composite lug
4a lug $4a_1$ inner end
$4a_2$ outer end
4b connecting lug
5 central lug
5a maximum raised surface
5b open portion side inclined surface
5c groove side inclined surface
10 elastic crawler device
20 sprocket (drive wheel) or idler (idling wheel)
30 track roller
$C_1$ gap
$C_2$ notched portion
$C_3$ open portion
D thickness direction of crawler main body (thickness direction)
L circumferential direction of crawler main body (circumferential direction)
R region
W width direction of crawler main body (width direction)

The invention claimed is:

1. An elastic crawler comprising:
an endless belt-like main body having elasticity;
a plurality of cores respectively having a pair of wings and being embedded in a manner spaced from each other in a circumferential direction of the main body, the wings respectively extending from a widthwise inner side of the main body toward a widthwise outer side of the main body;
a track roller rolling surface formed on an inner circumferential surface of the main body in a manner extending in the circumferential direction of the main body;
a recess formed on the inner circumferential surface of the main body in a manner extending between ones of the wings adjacent in the circumferential direction of the main body toward the widthwise outer side of the main body; and
a plurality of lugs formed on an outer circumferential surface of the main body, the lugs respectively extending in a width direction of the main body between ones of the cores adjacent in the circumferential direction of the main body from one end overlapping the track roller rolling surface in a thickness direction of the main body toward the other end overlapping a part in which the wings of the cores are embedded in the thickness direction of the main body, and wherein the track roller rolling surface is recessed on the outside in the width direction of the main body and the recess extends from the recessed track roller rolling surface and towards the crawler widthwise outer sides.

2. The elastic crawler according to claim 1, comprising a connecting lug being formed between adjacent lugs in the circumferential direction of the main body and connecting the adjacent lugs.

3. The elastic crawler according to claim 2, wherein:
the connecting lug is provided so as to form a gap at a position overlapping the recess in the thickness direction of the main body, the gap being formed by one of the adjacent lugs in the circumferential direction of the main body and the connecting lug.

4. An elastic crawler device comprising:
the elastic crawler according to claim 3; and
a drive wheel, an idling wheel and a track roller onto which the elastic crawler is wound.

5. The elastic crawler according to claim 2, wherein:
the connecting lug is provided so as to form a gap at a position overlapping the track roller rolling surface and the cores in the thickness direction of the main body, the gap being formed by one of the adjacent lugs in the circumferential direction of the main body and the connecting lug.

6. An elastic crawler device comprising:
the elastic crawler according to claim 5; and
a drive wheel, an idling wheel and a track roller onto which the elastic crawler is wound.

7. An elastic crawler device comprising:
the elastic crawler according to claim 2; and
a drive wheel, an idling wheel and a track roller onto which the elastic crawler is wound.

8. An elastic crawler device comprising:
the elastic crawler according to claim 1; and
a drive wheel, an idling wheel and a track roller onto which the elastic crawler is wound.

9. The elastic crawler according to claim 1, wherein the recess extends in a widening manner toward the crawler widthwise outer sides.

* * * * *